United States Patent [19]
Reger et al.

[11] Patent Number: 4,800,389
[45] Date of Patent: Jan. 24, 1989

[54] RADAR APPARATUS

[75] Inventors: Philip R. Reger, Newtown Square; Bob M. Dobbins, Villanova, both of Pa.

[73] Assignee: Mars Electronics, West Chester, Pa.

[21] Appl. No.: 938,506

[22] Filed: Dec. 5, 1986

[51] Int. Cl.⁴ .............................................. G01S 13/00
[52] U.S. Cl. ..................................... 342/175; 342/158
[58] Field of Search ............................... 342/175, 158

[56] References Cited

U.S. PATENT DOCUMENTS 3,196,349  7/1965  Fryklund ............................. 342/158

OTHER PUBLICATIONS

"Introduction to Radar Systems", Merrill I. Skolnik, pp. 359-356, McGraw Hill, 1980.

Primary Examiner—Thomas H. Tarcza
Assistant Examiner—Mark Hellner
Attorney, Agent, or Firm—Curtis, Morris & Safford

[57] ABSTRACT

Improved radar apparatus includes a rotatable antenna structure which includes an antenna disposed within a housing which is rotatably driven. Also disposed within the rotatable housing are a unitary magnetron, microwave circulator and microwave limiter device which rotates when the housing is rotatably driven. Additionally, a transmitter, such as a modulator coupled to the unitary device and a receiver also coupled to the unitary device are disposed within the rotatable housing. Preferably, the antenna is formed as a slotted wave guide antenna. Radar signals transmitted from and reflected to the antenna pass through a slotted filter which is mounted in front of the antenna. A commutator, preferably formed of slip rings and brushes, serves to electronically connect the transmitter and receiver within the housing to signal processing circuitry fixedly disposed externally of the housing, thereby permitting the housing to rotate while coupling electrical signals to and from the transmitter and receiver.

11 Claims, 5 Drawing Sheets

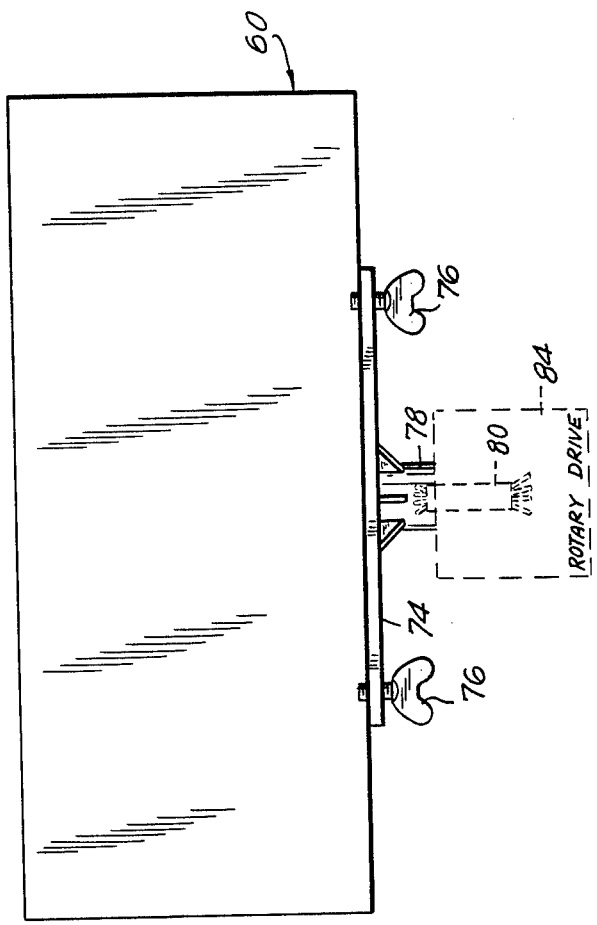

RADAR APPARATUS

BACKGROUND OF THE INVENTION

This invention relates to improved radar apparatus and, more particularly, to a rotatable radar structure that is of compact design and is formed with a minimum number of microwave and electrical components.

Conventional radar apparatus now available for marine applications, and particularly adapted for the so-called recreational market (e.g. non-commercial and non-military uses) is provided with two parabolic antennas, one for transmitting radar signals and the other for intercepting reflected radar signals. In this design, the antennas are disposed one atop the other; and for proper operation, the two antennas should be of identical configuration and should exhibit exact alignment with respect to each other. One disadvantage associated with such dual antennas arises out of the fact that if there is significant mechanical tolerance in the antenna assemblies, skewing between the transmit and receive structures may result, thus reducing the accuracy of detecting and displaying the reflected radar signals.

Another disadvantage associated with the aforementioned dual antenna structure arises out of mechanical vibration of the radar unit. Such vibration may result in deterioration of the mechanical components causing serious faults and possibly mechanical failure. To minimize such vibration, it is desirable to locate the mass of the radar structure at or close to the axis of rotation. This, however, is not easily attained in the dual parabolic antenna arrangement.

Yet another disadvantage associated with parabolic antennas relates to the side lobes of the transmit/receive pattern. These side lobes constitute a significant factor in false target appearances.

The aforementioned disadvantages associated with parabolic transmit and receive antennas generally have been overcome with the introduction of the slotted wave guide antenna. In particular, a single slotted wave guide antenna may be used both for transmission and reception of radar signals, thereby obviating the need for precise assembly and mounting of two separate antenna structures. Also, very low side lobes are present in the slotted wave guide antenna, resulting in a marked improvement. As a result, signal loss is reduced and the need for significantly higher power, as required previously by dual parabolic antennas, has been reduced. Still further, the presence of crosspolar interference, which is due to background reflections and which is most significant at a 45° angle in parabolic antennas, is substantially reduced when using a slotted wave guide antenna. This crosspolar interference is further reduced when a slotted filter is positioned in front of the slotted wave guide.

One proposed radar assembly which incorporates the aforementioned slotted wave guide antenna is comprised of a transmitter, such as a pulse modulator and a magnetron, a circulator which couples the radar pulses generated by the magnetron to the antenna and which also couples reflected radar signals from the antenna to a receiver, and a limiter which is disposed between the circulator and the receiver. In this type of arrangement, tunable wave guides connect the magnetron to the circulator, the circulator to the limiter and the limiter to the receiver. Typically, the magnetron, circulator, limiter and receiver all are fixedly supported in a suitable cabinet, or housing, leaving only the slotted wave guide antenna to rotate. A conventional rotary drive is used to rotate the antenna; and a so-called rotary joint provides a microwave coupling between the antenna and the circulator. However, it has been found that the rotary joint which is needed to permit the antenna to rotate while providing microwave coupling between it and the circulator, is a source of power loss. Furthermore, a tunable wave guide must be used to connect the circulator to the rotary joint and that joint itself must be tunable. In the absence of precise tuning of each of the aforementioned wave guides, signal loss may be present and false echo signals may be displayed.

Typically, simple electrical wires are used to connect signal processing circuitry to the transmit modulator for supplying proper control and trigger pulses to that modulator, and also to connect the signal processing circuitry to the receiver in order to process and display the reflected radar signals. Heretofore, a minimum of six wires had been used for such an electrical interconnection, one wire to supply operating voltage to the modulator, another wire to supply ground or reference potential to the modulator, another wire to supply trigger signals to the modulator, yet another wire to supply operating potential to the receiver, a further wire to supply ground potential to the receiver and an additional wire to receive the information (or video) signals from the receiver. In addition, a DC pulse width control signal normally is supplied over yet a further wire to the modulator and another wire is used to supply a gain and/or sensitivity control signal to the receiver. As a result, six or eight wire interfaces have been provided between the radar transmit/receive circuitry and the signal processing circuitry. This has added to the difficulty and expense in constructing and assembling radar devices.

Recently, a unitary device has been introduced which combines, in one structure, the magnetron, circulator and limiter which previously had been constructed as individual devices. This unitary magnetron, circulator and limiter device is manufactured by the English Electric Valve Company, Limited and has been identified with the trademark "DUPLETRON". Although the use of a "DUPLETRON" device offers the advantage of reducing construction and assembly costs and reduces the size and space requirements of the microwave components included in a typical radar assembly, the aforementioned difficulty associated with the rotary joint nevertheless is present.

OBJECTS OF THE INVENTION

Therefore, it is an object of the present invention to avoid the aforementioned disadvantages and defects associated with prior art radar assemblies.

Another object of this invention is to eliminate the need for a rotary joint of the aforementioned type.

Still another object of this invention is to provide an improved radar apparatus which reduces signal loss, minimizes power requirements, avoids mechanical problems and exhibits a relatively compact structure.

An additional object of this invention is to provide a rotatable radar structure in which a radar antenna rotates, a housing is coupled to and rotatable with that antenna, and the microwave components needed to transmit and receive radar signals are mounted within the housing and, thus, are rotatable with the antenna.

A still further object of this invention is to minimize the number of electrical wires which are needed to interconnect signal processing circuitry with the radar modulator and receiver.

Yet another object is to provide a simple 5-wire commutator for interconnecting the aforementioned signal processing circuitry and the radar modulator and receiver.

Still an additional object of this invention is to provide a unitary magnetron, circulator and limiter device, preferably the "DUPLETRON" device, mounted in a housing, along with the modulator and receiver, that rotates with the radar antenna.

Another object of this invention is to permit the use of relatively low voltage signals (on the order of about 12 volts) for coupling between the modulator and receiver mounted within the rotatable housing and the signal processing circuitry which is fixedly disposed externally of that housing.

An additional object of this invention is to obviate the need for iris-type mechanical tuning devices which heretofore have been required in the tunable wave guides which have been used with rotary joints.

A still further object of this invention is to provide a slotted wave guide antenna that is "end-fed" rather than "center-fed", thereby avoiding the need for tuning adjustments in the microwave feed structure, as heretofore required in "center-fed" arrangements.

Various other objects, advantages and features of the present invention will become readily apparent from the ensuing detailed description, and the novel features will be particularly pointed out in the appended claims.

SUMMARY OF THE INVENTION

In accordance with this invention, radar apparatus is provided with a rotatable antenna structure having an antenna, such as a slotted wave guide antenna, therein. Mounted on the antenna structure and rotatable therewith are the usual radar transmitter (or modulator) and receiver, and also a unitary magnetron, circulator and limiter device. As one aspect of the invention, the rotatable antenna structure is formed as a housing to which the antenna is secured and within which are disposed the unitary device as well as the transmitter and receiver.

In accordance with one advantageous feature of this invention, the slotted wave guide antenna is terminated at one end thereof and a wave guide couples the unitary device to the other end thereof. The wave guide is of U-shaped configuration; and it too is disposed within the rotatable housing.

In another advantageous feature of the present invention, the housing is formed of microwave shielding material and constitutes a common shield for the transmitter and the receiver. Preferably, the housing is provided with an aperture disposed opposite an adjustable control element provided on the transmitter or receiver, the aperture thus permitting an adjustment tool to engage the control element without requiring dismantling or disassembly of the radar structure. Of course, a suitable "plug" fills the aperture during normal operation of the radar apparatus, thereby preventing leakage or interference.

The transmitter and receiver disposed within the housing are electrically connected to signal processing circuitry which is externally of and fixedly disposed relative to that housing. The signal processing circuitry functions to provide operating power for the transmitter and receiver, and this circuitry also produces trigger pulses for the transmitter and operates to process the reflected radar signals. A commutator, preferably formed of conductive brushes and slip rings, serves to interconnect the fixed signal processing circuitry with the transmitter and receiver within the housing. In one embodiment, the slip rings are fixedly disposed interiorly of a rotary shaft which is mechanically connected to and driven so as to rotate the housing, and the conductive brushes are rotatable with the housing and ride on the slip rings. The signal processing circuitry is connected to the slip rings by simple electrical wires. In the preferred embodiment, five wires are used to supply operating power and ground potential to the transmitter and receiver, along with trigger pulses and a DC pulse width control to the modulator. Video output pulses and a DC tuning voltage are applied to another one of the five wires, and a DC gain control voltage as well as a sensitivity control signal are supplied to the receiver over yet another wire. As an alternative, the slip rings may rotate, these slip rings being connected by simple electrical wires to the transmitter and receiver, and the signal processing circuitry may be electrically connected to the slip rings by way of brushes.

As another feature of this invention, the rotary drive shaft, which preferably is hollow and which houses the aforementioned slip rings and brushes, is secured to a support plate and this plate is mechanically fastened to the housing. As one aspect of this invention, the support plate is fastened to the housing by means of quarter turn wing bolts, thereby facilitating facile and rapid assembly and disassembly of the radar structure during, for example, initial set-up or to permit modifications, adjustments, replacements and repairs, if necessary.

BRIEF DESCRIPTION OF THE DRAWINGS

The following detailed description, given by way of example, will best be understood in conjunction with the accompanying drawings in which:

FIG. 7 is a rear view of the radar structure showing the mechanical coupling of the rotatably driven support plate to that structure.

DETAILED DESCRIPTION OF A PREFERRED EMBODIMENT

Before describing the improved radar apparatus of the present invention, reference first is made to a typical prior art assembly. It is believed that the advantages and benefits achieved by the present invention will best be appreciated after understanding the prior art.

Figure 1:
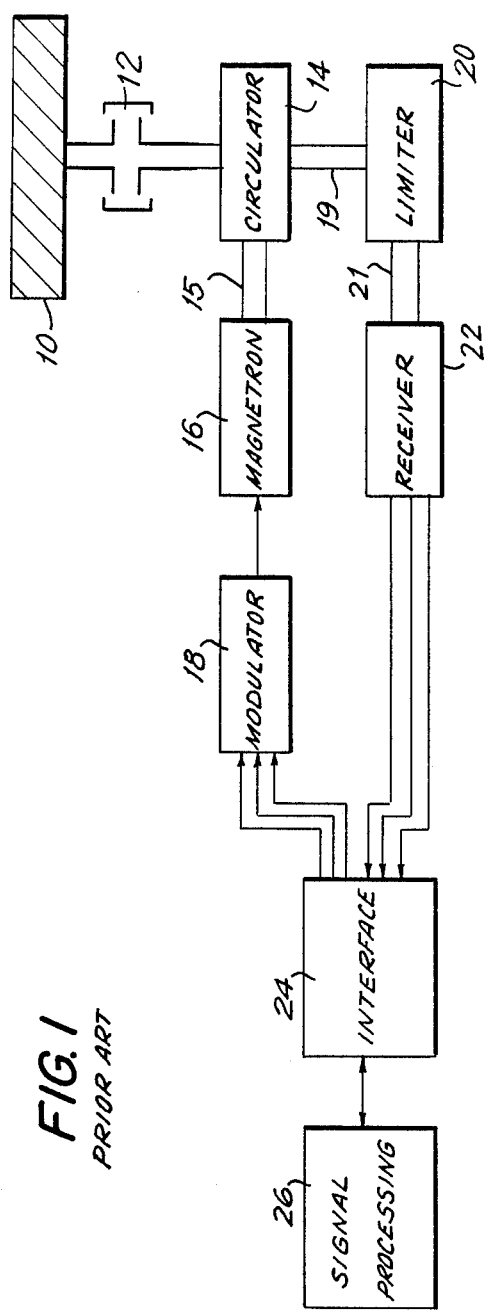
FIG. 1 is a block diagram of a prior art radar assembly.

Turning to FIG. 1, there is illustrated a block diagram of a typical prior art radar assembly comprised of a rotatable antenna 10, a circulator 14, a magnetron 16, a modulator 18, a receiver 22, an interface 24 and signal processing circuitry 26. Antenna 10 typically is formed as a slotted wave guide antenna having a center feed connection and formed as a longitudinal wave guide having slotted apertures disposed along the transmit/- receive wall thereof. A slotted filter optionally may be provided in front of this wall to pass transmitted and reflected radar signals to and from a target, respectively. Antenna 10 is rotatably driven by suitable drive means (not shown) to rotate through 360° or, alternatively, and if desired, the antenna may oscillate back and forth over an angle 180° or less.

Antenna 10 is coupled by way of a suitable microwave wave guide to circulator 14. However, and as is conventional, circulator 14 is fixedly disposed relative to the rotation (or oscillation) of antenna 10. In this regard, a suitable wave guide coupling must be provided to facilitate the rotation of the antenna while transmitting radar signals between circulator 14 and antenna 10. As is conventional, one such suitable wave guide coupling is a rotary wave guide coupling 12, also known as a rotary joint. This rotary joint permits antenna 10 to rotate relative to circulator 14 while passing radar signals therebetween. However, rotary joint 12 is a source of signal loss, thus requiring increased power to compensate for such loss.

Circulator 14, as is conventional, is coupled to magnetron 16 by way of a tunable wave guide 15 and to a limiter 20 by means of a tunable wave guide 19. Circulator 14 is of known construction and, as an example, provides for the clockwise circulation of signals which are supplied to one port to exit from the next adjacent port encountered by this clockwise rotation. Thus, signals which are supplied to circulator 14 at the port coupled to rotary joint 12 exit from the port coupled to limiter 20. Likewise, signals which are supplied to the circulator port coupled to magnetron 16 exit at the port coupled to the rotary joint. In this manner, radar pulses which are intended for transmission are not inadvertently supplied to receiver 22 and, likewise, reflected radar signals which are supplied to circulator 14 are not inadvertently mixed with the output of magnetron 16. Wave guides 15 and 16 which couple circulator 14 to magnetron 16 and limiter 20, respectively, are provided with tuning devices, such as adjustable irises, needed to provide a "match" between the illustrated microwave components and rotary joint 12. Such tuning devices also provide a "match" with the center-feed coupling to antenna 10.

Magnetron 16 is coupled to modulator 18 which supplies trigger pulses to the magnetron, these trigger pulses being used by the magnetron to generate high energy pulses in the microwave frequency range for transmission by antenna 10. Reference is made to U.S. Pat. No. 4,489,288 for a description of trigger and transmission pulse generation. As illustrated, the modulator is coupled to signal processing circuitry 26 by way of interface 24. The interface provides not only an electrical connection to the modulator but also provides impedance matching, frequency tuning (if necessary) and some additional signal processing.

Limiter 20 is coupled by way of tunable wave guide 21 to receiver 22. As is conventional, a refleted pulse received from a distant object by antenna 10 is of the same frequency as the high energy transmission pulse produced by magnetron 16, and this reflected pulse is limited by limiter 20 and converted to a suitable video signal by receiver 22. It will be appreciated that, in the interest of simplification, the various microwave and electronic components which are needed to detect the reflected pulse and to convert that pulse to a video signal are omitted. However, U.S. Pat. No. 4,489,288 provides a description of one embodiment of suitable receiving apparatus. Receiver 22 is coupled to signal processing circuitry 26 by interface 24.

Typically, a positive DC operating potential and ground potential are supplied to modulator 18, together with trigger pulse control signals and a DC pulse width control signal, the latter trigger pulse and DC control signal being produced by signal processing circuitry 26. A minimum of three wires and, typically, four wires have been used in the prior art (as shown in FIG. 1) to supply modulator 18 with the aforementioned power supply voltages and control signals. Likewise, a positive DC operating potential and ground potential are supplied to receiver 22, usually by two separate wires, and the video and output signal produced by the receiver normally is applied to a third wire. In addition, a DC tuning control signal, a DC gain control signal and a sensitivity control signal all should be supplied to the receiver, and these control signals, even if superposed, normally require at least one more wire. Thus, although only six wires are schematically illustrated in FIG. 1, eight wires normally are provided between interface 24 and the modulator/receiver combination. The interface thus is known as an 8-wire interface. It is recognized that the complexity and cost of assembling the prior art arrangement increases as the number of electrical wires that extend between interface 24, modulator 18 and receiver 22 increases. Conversely, assembly costs may be reduced if the number of such electrical wires is reduced.

Signal processing circuitry 26 may be of conventional construction known to the prior art. In the interest of brevity, further description of this circuitry is not provided. It will be appreciated, however, that digital circuitry, such as microprocessor-controlled processing circuitry, may be used to generate the signals supplied to modulator 18 and the control signals supplied to receiver 22, and to process the video signals produced by the receiver in response to reflected radar signals.

The present invention proceeds upon the recognition of various defects and disadvantages attendant the prior art arrangement shown in FIG. 1. As mentioned previously, rotary joint 12 presents a significant signal loss, thereby requiring radar signals of increased power. As a result, the power supply used to provide operating potential to modulator 18, magnetron 16 and receiver 22 must be capable of generating relatively high operating voltages. As will be appreciated, this presents relatively high heat loss and suffers the additional expense of requiring high energy. Furthermore, the use of separate devices as circulator 14, magnetron 16 and limiter 20 adds to the overall size, bulk and weight of the radar assembly. Also, the prior art arrangement shown in FIG. 1 generally needs separate microwave shielding about magnetron 16 and the combination of limiter 20 and receiver 2. Such additional shielding also adds to the bulk and weight of the radar assembly.

These and other disadvantages of the prior art are overcoe primarily by eliminating rotary joint 12 and by combining circulator 14, magnetron 16 and limiter 20 into a single, unitary device, such as the "DUPLETRON" device, mentioned above. When rotary joint 12 is eliminated, the need for tunable wave guides, such as wave guides 15, 19 and 21, is avoided. The rotary unit is eliminated by mounting the modulator, the "DUPLETRON" device and the receiver on the very same antenna structure upon which the antenna is mounted. Thus, the modulator, "DUPLETRON" device and receiver rotate with the antenna. This means that the wave guides needed to connect the antenna to the "DU-PLETRON" and the "DUPLETRON" to the receiver can be fixed and need not permit relative rotations therebetween, as was provided by rotary joint 12 of the prior art. By providing a fixed wave guide, that is, a wave guide whose parts do not rotate relative to each other, a relatively simply commutating arrangement may be used to couple operating voltage, trigger pulses, control signals and video signals between the signal processing circuitry and the modulator/receiver combination. As will be described below, the preferred embodiment of such a commutator is formed of slip rings and brushes, elements which are known to those of ordinary skill in the art.

Figure 2:
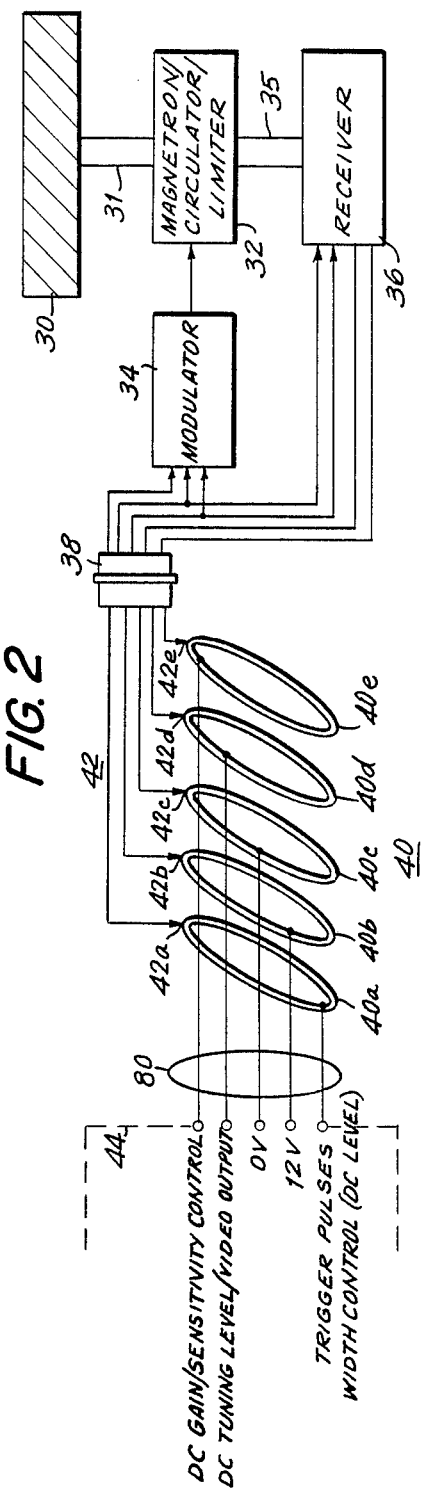
FIG. 2 is a block diagram of one embodiment of the present invention.

A block diagram of a preferred emmbodiment of the present invention which has just been described broadly is illustrated in FIG. 2. As illustrated, an antenna 30, preferably a slotted wave guide antenna having an end-feed connection, is coupled by a wave guide 31 to a unitary magnetron, circulator and limiter device 32 (the "DUPLETRON" device), and this "DUPLETRON" device is connected by electrical conductors, such as wires, to a modulator 34. The "DUPLETRON" device also is coupled to a receiver 36 by a wave guide 35. It will be appreciated that modulator 34 may be similar to aforedescribed modulator 18 and receiver 36 may be similar to receiver 22 of the prior art.

Modulator 34 and receiver 36 are connected by electrical wires, which need be capable of carrying no more than approximately 12 volts DC, to signal processing circuitry 44 by means of a commutator formed of slip rings 40 and brushes 42. Signal processing circuitry 44 may be similar to aforedescribed signal processing circuitry 36. In the illustrated embodiment, only five electrical wires are needed to connect the modulator/receiver combination to signal processing circuitry 44, and a simple 5-wire plug 38 may be used to connect the modulator/receiver to the commutator.

In accordance with the present invention, a rotatable antenna structure is provided (described below with respect to FIGS. 3-7) for supporting antenna 30, "DU-PLETRON" device 32, modulator 34 and receiver 36. Plug 38 also is provided in this rotatable antenna structure.

As described below, the rotatable antenna structure is coupled by a hollow rotary shaft to a suitable rotary drive, such as a motor. As the shaft rotates, the antenna structure likewise rotates, thereby rotating antenna 30, "DUPLETRON" device 32, modulator 34, receiver 36 and plug 38. In one embodiment, slip rings 40 are mounted on a fixed support within the rotary shaft, and each slip ring is connected to a terminal which, in turn, is connected to signal processing circuitry 44. Plug 38, in turn, is connected by individual electrical wires, as shown in FIG. 2, to respective brushes that contact respective slip rings 40. As the antenna structure rotates, these brushes ride on the surface of the slip rings, remaining in electrical conductivity therewith, thus permitting the respective voltages and signals to be transmitted between the signal processing circuitry and the plug.

In an alternative embodiment, the slip rings are mounted on the interior wall of the hollow rotary shaft so as to rotate therewith. The terminals coupled to signal processing circuitry 44, as shown in FIG. 2, are connected to brushes which ride on, for example, the inner annular surfaces of these slip rings. Plug 38 is connected by respective wires, as shown, to fixed points on the slip rings, whereupon the slip rings and wires rotate in unison while the brushes which are connected to the terminals of the signal processing circuitry ride of the rotating slip rings. In either embodiment, voltages and signals are readily transferred between the signal processing circuitry and the modulator/receiver combination, and the latter rotates with the antenna structure.

As shown particularly in FIG. 2, and in accordance with the embodiment wherein brushes 42 are connected to plug 38 and ride upon the surface of slip rings 40, a 5-wire cable 80 couples the respective slip rings to the terminals which, in turn, are connected to signal processing circuitry 44. As an example, slip ring 40a is connected by one of the wires included in 5-wire cable 80 to a terminal which is supplied with modulator trigger pulses and also with a DC level which, in turn, controls the width of the pulses generated by modulator 34. The manner in which these trigger pulses are generated and supplied to slip ring 40a, as well as the manner in which the DC width control level is produced form no part of the present invention per se. Brush 42a rides on slip ring 40a to supply via plug 38, the trigger pulses and DC width control level to modulator 34. A 12 volt DC operating voltage is supplied by another wire included in cable 80 to slip ring 40b. Brush 42b rides on this slip ring to supply the 12 volt operating voltage to plug 38 and thence to modulator 34 and also to receiver 36. Similarly, ground potential, shown in FIG. 2 as 0 volts, is coupled by another wire included in cable 80 to slip ring 40c. Brush 42c rides on this slip ring to couple the ground potential to modulator 34 and to receiver 36. Thus, suitable operating potential is supplied to the modulator and receiver by means of only two wires.

Slip ring 40d is connected, by another wire included in cable 80, to a terminal which, in turn, supplies a video output signal to signal processing circuit 44. A DC tuning level also is supplied to this terminal, and this tuning level is within the range 0 to 9 volts. As shown, brush 42d rides on slip ring 40d, and this brush is coupled to receiver 36. Thus, the video output signal produced by the receiver is supplied, via brush 42d and slip ring 40d to the signal processing circuit. The DC tuning level is seen to be superposed on this video output signal.

Finally, another wire included in cable 80 is coupled to slip ring 40e to supply thereto a DC gain control voltage, on the order of 0.5-1.5 volts DC, this gain control voltage being used to control the gain of receiver 36. A sensitivity control signal on the order of about 0.3 volts peak-to-peak also is superposed on this wire and supplied to slip ring 40e, this sensitivity control voltage serving to remove "sea" clutter that otherwise might be picked up by the receiver. As shown, brush 42e rides on slip ring 40e to apply the DC gain control voltage and sensitivity control signal to receiver 36.

Thus, it is seen that a simple commutator arrangement is provided which, in combination with plug 38, functions as a 5-wire interface to connect signal processing circuitry 44 to the modulator/receiver combination.

Preferably, a switching arrangement is provided, similar to the capacitor-controlled switching circuit described in U.S. Pat. No. 4,489,288, to effectively "turn off" the magnetron portion of "DUPLETRON" device 32 immediately following the transmission of a radar pulse therefrom. Consequently, the transmitter section of the illustrated radar apparatus is turned off when the receiver section thereof is conditioned to detect a reflected pulse. By avoiding the concurrent operation of the transmitter and receiver sections, separate shielding of each section is obviated. Rather, and as described below, a common shield for the transmitter and receiver section is provided, this common shield constituting the housing of the radar structure.

Figure 3:
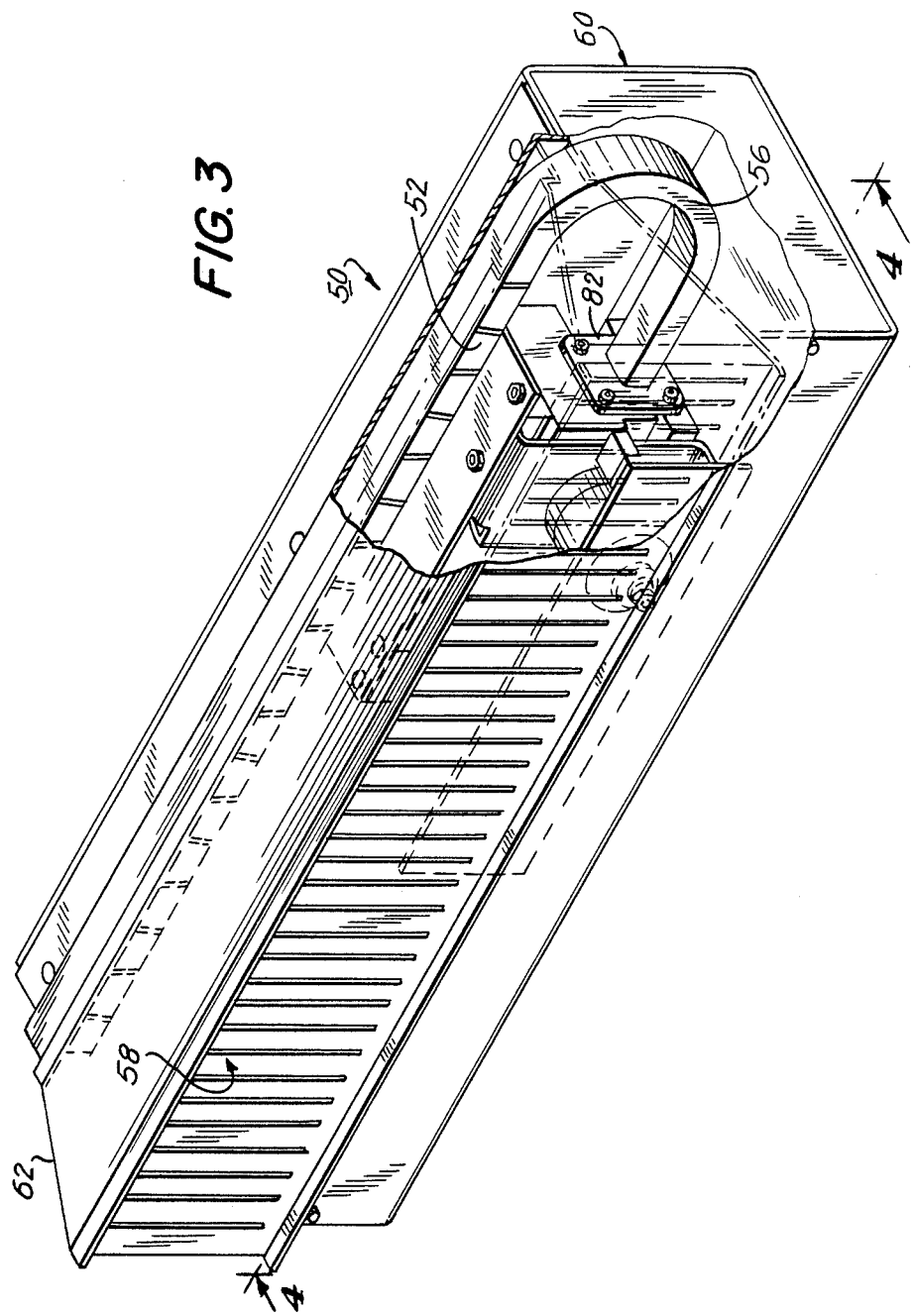
FIG. 3 is a perspective view of radar structure in accordance with the present invention.
Figure 4:
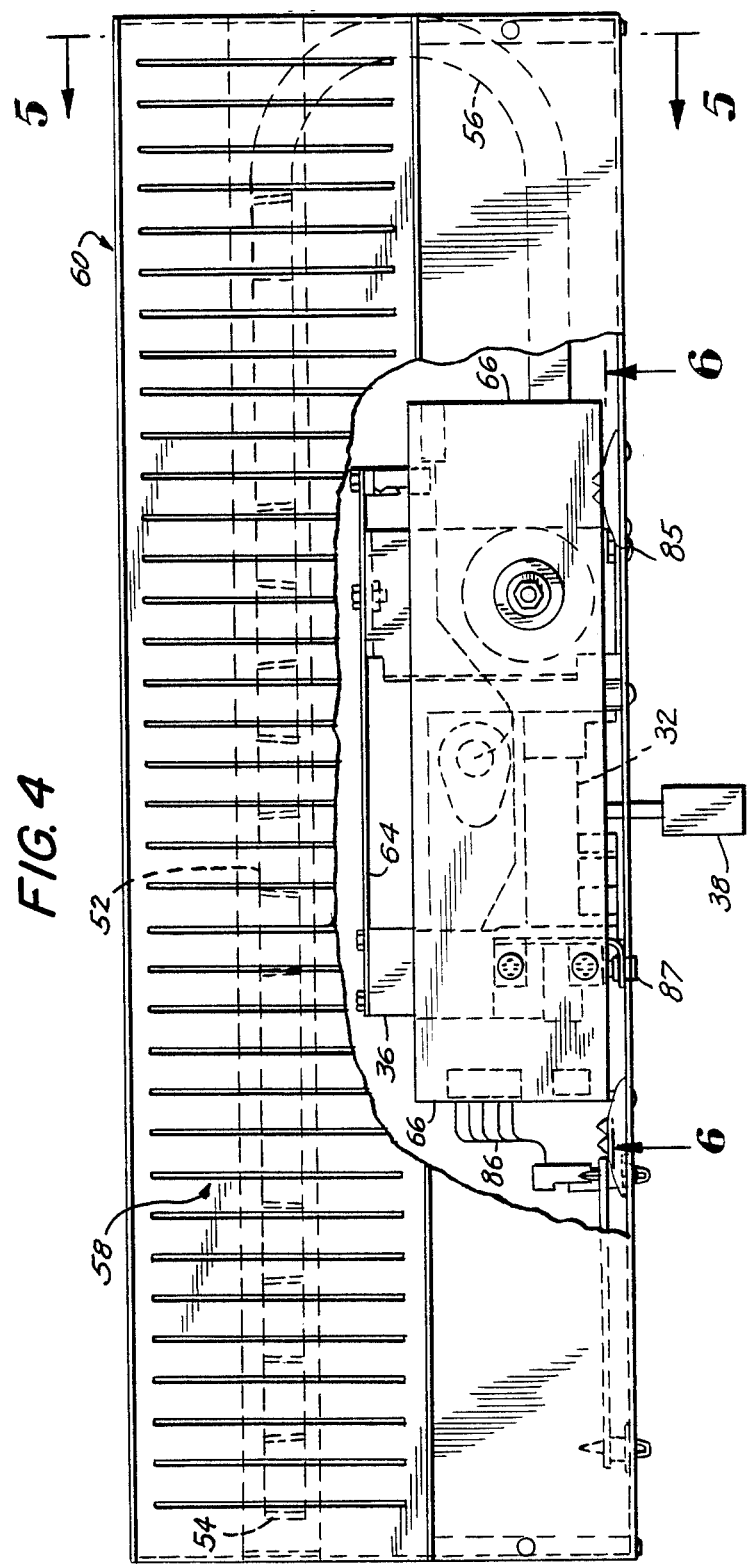
FIG. 4 is a front view, partially in section, of the radar structure shown in FIG. 3.
Figure 5:
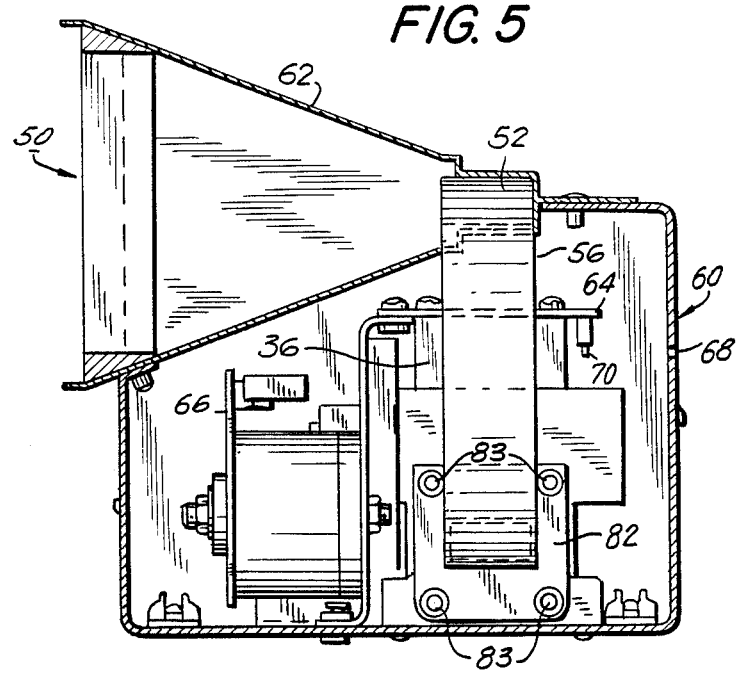
FIG. 5 is a sectional end view of the radar structure shown in FIG. 4 and taken along the section lines 5—5.

Turning now to FIGS. 3, 4 and 5, the preferred embodiment of the radar apparatus in accordance with the present invention is illustrated. FIG. 3 is a perspective view of this apparatus, FIG. 4 is a sectional view taken along lines 4—4 of FIG. 3 and FIG. 5 is a sectional end view taken along lines 5—5 of FIG. 4. The illustrated apparatus comprises a rotatable antenna structure 50 which contains a slotted wave guide antenna 52 formed as a longitudinal wave guide having slotted apertures therein. It is appreciated that the wave guide is formed of suitable material known to those of ordinary skill in the microwave art. The distribution of the slotted apertures need not be uniform and, as illustrated, adjacent apertures appear to be slightly skewed with respect to each other.

Antenna 52 is terminated at one end thereof with a conventional matching termination 54 and is fed, or supplied, with microwave radar pulses at its opposite end. This end-feed coupling of antenna 52 also serves to deliver radar pulses which are reflected from a distant object to the "DUPLETRON" device coupled thereto by way of a U-shaped wave guide 56. The "DUPLETRON" device and the transmit/receive electronics are described further below.

Preferably, a slotted filter 58 is disposed in front of antenna 52, the slotted filter being of conventional construction and formed of an array of vertically disposed metallic plates separated by styrofoam blocks for support and rigidity. It is appreciated that radar pulses which are emitted from antenna 52 thus pass through slotted filter 58 and, conversely, reflected radar pulses pass through this filter before they are picked up by the antenna.

As best shown in FIGS. 3 and 5, a horn 62, formed of a suitable metal conventionally used in microwave transmission, is coupled at one end (for convenience, its "rear" end) to antenna 52 and has top and bottom walls which diverge as they extend outward from said rear end of the horn. Filter 58 is secured to horn 62 in the vicinity of the widest dimension of the diverging walls thereof (i.e. the front end of the horn). It is appreciated that the horn serves to guide both the emitted and reflected radar signals.

A housing 60, also formed of thin metal construction normally used in microwave applications, is secured to horn 62, as best shown in FIGS. 3 and 5. Preferably, screws are used to secure the housing to the horn; but it is appreciated that, if desired, other fastening means may be utilized, if desired, such as welding, cement, etc. Housing 60 is of generally rectangular configuration, except for an opening thereof along the top wall, best shown in FIG. 5, whereat the housing mates to the bottom wall of horn 62. It is appreciated, therefore, that this bottom wall of the horn thus forms an integral part of the housing. The combination of this bottom wall of horn 62, the top, rear, bottom and front walls of housing 60 and the left and right end walls of the housing constitute a shielded enclosure for the microwave components mounted within housing 60.

As illustrated in FIGS. 3, 4 and 5, U-shaped wave guide 56 couples the end-feed connection of antenna 52 to a wave guide 82 which, in turn, serves as a guide to "DUPLETRON" device 32. A suitable mounting flange on wave guide 56 is secured by screws 83 to wave guide 82. Although not clearly identified in FIGS. 3–5, it nevertheless will be appreciated that "DUPLETRON" 32 is connected electrically to modulator 34. In this regard, a printed circuit board 64 (FIGS. 4 and 5) and also a printed circuit board 66 (FIGS. 4–6) are disposed within housing 60 and serve two useful functions: (1) the printed circuit boards provide electrical interconnections between the various electrical components, and also contain various circuit components, such as modulator 34, amplifiers and receiver IF circuitry; and (2) the printed circuit boards provide physical support for "DUPLETRON" device 32, for receiver 36, for modulator 34 and for the receiver IF circuitry. Preferably, receiver 36 is mounted directly to printed circuit board 64 which supports the receiver IF circuitry. Thus, the receiver (that is, the RF receiver) may be thought of as being mounted directly to the IF receiver circuitry. By mounting these microwave components on printed circuit boards as aforesaid, an integral transmit/receive construction is attained, this integral construction being assembled and disassembled easily to housing 60, thereby facilitating assembly and servicing of the radar structure. Screws 85 and 87 (FIG. 6) are used to secure this transmit/receive construction to housing 60. For simplification, the presence of electrical components normally mounted on circuit boards 64 and 66 are omitted except that one example of an adjustable control component 70 is illustrated in FIG. 5 as being mounted on printed circuit board 64. It also will be recognized that, in addition to conductors normally present on the printed circuit boards, electrical wires may be used to interconnect certain ones of the electrical components and microwave modules normally provided in housing 60, as represented by, for example, wires 86 and 88.

Another advantage offered by housing 60 and printed circuit boards 64 and 66 disposed therewithin is the facility by which certain electrical characteristics of the electronic circuitry supported within housing 60 may be adjusted. In the example shown in FIG. 5 wherein adjustable control component 70 is mounted on printed circuit board 64, the control component may be a potentiometer, a rheostat, an adjustable inductive device, or the like. In accordance with these examples, component 70 is provided with an adjustable element whose setting, typically, may be changed as desired by adjusting that element with a suitable adjustment tool, such as a screw driver. To obviate the need to disassemble housing 60, the housing is provided with one or more apertures 68 which are disposed opposite and aligned with the adjustable element of component 70. An adjustment tool, such as the aforementioned screw driver, thus may pass through aperture 68 to engage and adjust component 70. Of course, during normal operation of the illustrated apparatus, a suitable plug formed of metallic material is inserted into aperture 60 to prevent microwave radiation leakage. It is, of course, recognized that adjustable control component 70 may be included in modulator 34 or in receiver 36 for the purpose of adjusting the electrical characteristics thereof.

Preferably, the various microwave components, such as "DUPLETRON" device 32, modulator 34, RF receiver 36 and printed circuit boards 64 and 66, together with the receiver IF circuitry thereon, are secured to the bottom wall of housing 60. As illustrated, suitable fasteners, such as screws 85 and 87, are used for this purpose. As will be described, the bottom wall of housing 60 is coupled to rotary drive means; and by coupling the microwave components to the bottom wall, the risk of damage or faults to these components, to antenna 52, to filter 58 and to horn 62 due to mechanical vibrations is minimized. Thus, antenna 52, "DUPLETRON" device 32, modulator 34 and receiver 36 all are mounted on the rotatable antenna structure formed of housing 60.

Figure 6:
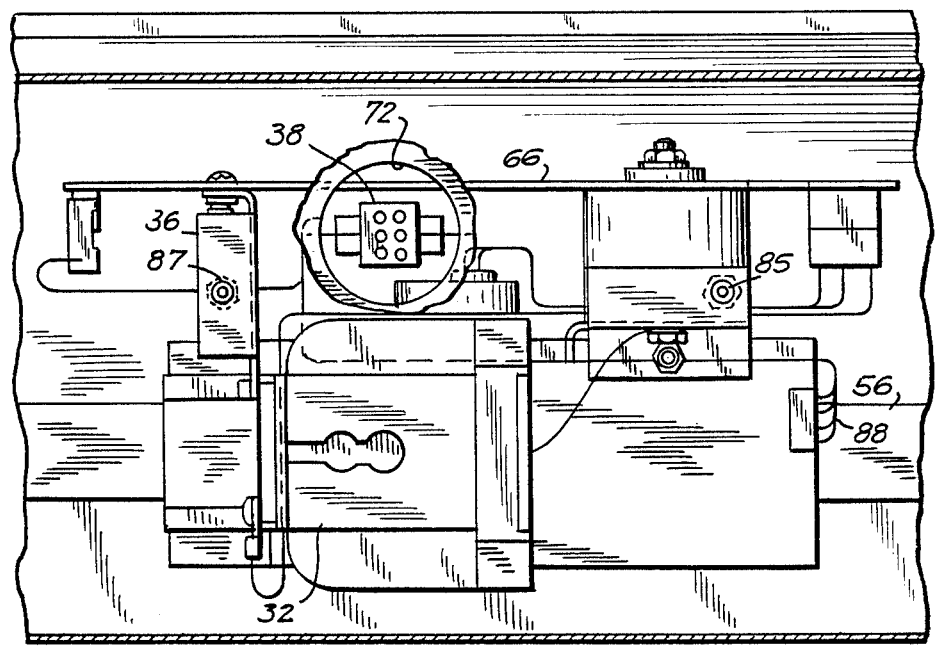
FIG. 6 is a bottom view of a portion of the structure shown in FIG. 4.

As shown in FIG. 6, an aperture 72 is provided in the bottom wall of housing 60. The purpose of this aperture is to permit a simple 5-wire cable to pass from the signal processing circuitry that is disposed externally of housing 60 and connect the electrical circuitry supported within the housing, as discussed in conjunction with FIG. 2. This 5-wire cable is coupled to plug 38 (FIGS. 4 and 6) which, in turn, is connected to electrical wires that extend to modulator 34 and receiver 36 (FIG. 2). As also shown in FIG. 6, the electrical components and microwave modules, and particularly "DUPLETRON" device 32, are positioned in relative close proximity to aperture 72, this aperture coinciding with the center of rotation of the radar apparatus. That is, the mass of the aforementioned integrated transmit/receive construction may be thought of as being centered at the axis of rotation of the radar apparatus. The positioning of the electrical circuitry on printed circuit boards 64 and 66, together with the positioning thereon of "DUPLETRON" device 32, has been done empirically to locate the center of gravity of the integrated transmit/receive construction substantially at the axis of rotation of the radar apparatus and also at or on the bottom wall of housing 60.

FIG. 7 is a rear view which illustrates the manner in which the radar apparatus, and particularly housing 60, is rotatably driven. A support plate 74 is secured to the bottom wall of housing 60 by manually tightened fasteners 76. In the preferred embodiment, four such fasteners are provided, and these fasteners are constructed as quarter-turn wing bolts. These wing bolts are rotatably mounted in support plate 74 and mate with apertures formed in the bottom wall of the housing and adapted to receive these wing bolts. In addition, a hollow shaft 78 is fastened by suitable webs to support plate 74, this shaft being coupled, in turn, to a rotary drive 84. Thus, as the rotary drive turns shaft 78, support plate 74 likewise rotates which, in turn, rotates housing 60.

Five-wire cable 80 is shown in FIG. 7 as passing through the interior of shaft 78. Although not shown in FIG. 7, it will be appreciated that the wires included in cable 80 are connected, as by solder connections, to slip rings 40 (FIG. 2), these slip rings being fixedly disposed within shaft 78 such that the shaft rotates relative to the slip rings. Plug 38 (FIGS. 4 and 6) is connected to individual wires which, in turn, are electrically connected to brushes 42 that ride on respective ones of the slip rings, as discussed above in connection with FIG. 2. Hence, shaft 78 rotates, 5-wire cable 80 remains stationary, and brushes 42 rotate with the shaft and, thus, with housing 60 to ride on slip rings 40. Thus, notwithstanding the rotation of housing 60, the electrical components contained therein nevertheless remain in electrical contact with signal processing circuitry 44 by way of slip rings 40, brushes 42 and cable 80.

One advantage offered by using quarter-turn wing bolts 76 is the rapid removal of housing 60 from drive shaft 78 and rotary drive 84. A technician thus may replace one radar structure with another easily and rapidly. Also, if necessary, modules and components contained within housing 60 may be easily tested and replaced, if necessary, without requiring actual "on-site" repairs which otherwise would be needed if housing 60 could not be removed from the rotary drive apparatus.

As mentioned previously, housing 60 functions as a common shield for modulator 34 and receiver 36. This differs from prior art constructions in which individual shields are needed for the transmit modules and for the receive modules of radar apparatus. By switching off modulator 34 and the magnetron module included in "DUPLETRON" device 32 during a receive phase (i.e. during the time interval in which reflected radar signals are expected), a common shield can be employed. There is no interference, therefore, between the transmit apparatus and the receive apparatus included in the radar structure.

While the present invention has been particularly shown and described with reference to a preferred embodiment, it will be readily apparent to those of ordinary skill in the art that various changes and modifications may be made without departing from the spirit and scope of the invention. For example, and as mentioned above, slip rings 40 may rotate and, thus, these slip rings may be electrically soldered to wires that extend to plug 38. In this regard, 5-wire cable 80 may interconnect signal processing circuitry 44 to the slip rings by means of brushes which ride on the rotating slip rings. Further, it will be recognized that other suitable circuitry may be housed within housing 60 to facilitate the generation and supply of operating voltages, and to facilitate or enhance the signals which are used during radar transmission and reception. Still further, although one type of slotted antenna has been shown herein, namely, a longitudinal wave guide having non-uniform and skewed apertures therein, other slotted wave guide antenna designs may be used with the present invention.

It is, therefore, intended that the appended claims be interpreted as covering the embodiments described herein and equivalents thereto.

What is claimed is:

1. A radar apparatus comprising: transmit means for generating radar signals to be transmitted; receive means for receiving reflected radar signals; an antenna coupled to said transmit and receive means; a rotatable antenna structure to which said antenna is secured; and a common housing formed of microwave shielding material and secured to said rotatable antenna structure and in which said transmit and receive means are housed; said transmit means and said receive means including a unitary magnetron, microwave circulator and microwave limiter device.

2. The apparatus of claim 1 wherein said antenna comprises a longitudinal wave guide having a first end, termination means mounted on said first end, a second end, and means for coupling said unitary device to said second end, whereby radar signals generated by said transmit means are coupled to said second end and propagate along said longitudinal wave guide to said first end, and whereby reflected radar signals impinge said longitudinal wave guide and are supplied from said second end to said unitary device.

3. The apparatus of claim 2 further comprising a microwave guide disposed in said housing for coupling said unitary device to one end of said slotted wave guide antenna.

4. The apparatus of claim 1 wherein said unitary device also is disposed within said housing; and further comprising a support plate, means for securing said support plate to the exterior of said housing, and means for rotatably driving said support plate.

5. The apparatus of claim 4 wherein said means for securing said support plate to said housing comprises manually tightened fastening means.

6. The apparatus of claim 5 wherein said fastening means comprise plural quarter turn wing bolts.

7. A radar apparatus comprising: transmit means for generating radar signals to be transmitted; receive means for receiving reflected radar signals; an antenna coupled to said transmit and receive means; a rotatable antenna structure to which said antenna is secured; a common housing formed of microwave shielding material and secured to said rotatable antenna structure and in which said transmit and receive means are housed; at least one of said transmit and receive means including manually adjustable circuit means having an adjustable control element; and said housing being provided with an aperture substantially opposite said control element to permit an adjustment tool to pass therethrough into engagement with said control element.

8. A radar apparatus comprising: transmit means for generating radar signals to be transmitted; receive means for receiving reflected radar signals; an antenna coupled to said transmit and receive means; a rotatable antenna structure to which said antenna is secured; a common housing formed of microwave shielding material and secured to said rotatable antenna structure and in which said transmit and receive means are housed; signal processing means disposed externally of and fixed relative to said housing for producing operating power for said transmit and receive means, for producing trigger pulses for said transmit means and for processing the received reflected radar signals; and commutator means for electrically coupling said signal processing means to said transmit and receive means, said commutator means comprising conductive brushes rotatable with said antenna structure and electrically connected to said signal processing means; said operating power comprising ground potential and an operating potential, said signal processing means additionally producing a sensitivity control signal for said receive means, and said signal processing means being coupled to five slip rings and said slip rings being engaged by five respective conductive brushes for said ground potential, said operating potential, said trigger pulses, said received reflected radar signals and said sensitivity control signal, respectively.

9. A radar apparatus comprising: transmit means for generating radar signals to be transmitted; receive means for receiving reflected radar signals; an antenna coupled to said transmit and receive means; a rotatable antenna structure to which said antenna is secured; and a common housing formed of microwave shielding material and secured to said rotatable antenna structure and in which said transmit and receive means are housed; said transmit means and said receive means being of integral construction removably secured to said housing.

10. The apparatus of claim 9 wherein said integral construction of said transmit means and said receive means is secured to said housing such that the center of gravity of said integral construction is located substantially at the axis of rotation of the antenna structure.

11. A radar apparatus comprising: transmit means for generating radar signals to be transmitted; receive means for receiving reflected radar signals; an antenna coupled to said transmit and receive means; a rotatable antenna structure to which said antenna is secured; and a common housing formed of microwave shielding material and secured to said rotatable antenna structure and in which said transmit and receive means are housed; said receive means comprising an RF receiver and IF receiver circuitry, said RF receiver being mounted directly to the IF receiver circuitry.

* * * * *